UNITED STATES PATENT OFFICE.

EDWARD A. WHITCOMB AND JOHN J. RIDDLE, OF CINCINNATI, OHIO, ASSIGNORS OF PART INTEREST TO MARY E. KING, OF SAME PLACE.

FLUX FOR WELDING.

SPECIFICATION forming part of Letters Patent No. 341,784, dated May 11, 1886.

Application filed June 18, 1883. Renewed October 1, 1885. Serial No. 178,746. (Specimens.)

*To all whom it may concern:*

Be it known that we, EDWARD A. WHITCOMB and JOHN J. RIDDLE, citizens of the United States, residing in Cincinnati, in the county of Hamilton and State of Ohio, have invented certain new and useful Improvements in Fluxes for Welding, Forging, and Bronzing Metals, of which the following is a specification.

Our invention relates to an improved flux.

The object of our invention is to provide a flux which will more thoroughly clean and prepare the metals for welding, and which will, in addition to these properties, prevent the oxidation and decarbonization of the metals while being heated for welding or for hammering and drawing.

It is difficult to weld steel without decarbonizing it by overheating, and the efforts to avoid this frequently result in welding at too low a temperature, and consequently preventing a thorough union of the fiber. It is also difficult, with some kinds of steel, to heat and hammer or draw it into the required shape without either producing too much of a scale, and hence loss of metal, or else working it at too low a temperature and injuring the homogeneousness of the texture.

Our invention has for its object the overcoming of these difficulties by the use of a flux, which melts readily, adheres to the metal, preventing decarbonization and oxidation of the metal even at a high red and approaching a white heat, thereby heating the metal to the proper semi-waxing condition for easy welding and hammering or drawing, whichever may be required.

The preferred formula of making our flux is as follows: Take fluor-spar, one hundred parts, finely pulverized; carbonate of soda, ninety parts, also finely pulverzed; and sulphate of lime, fifty parts, likewise pulverized, and thoroughly mix the same together. This formula contemplates the use of fluor-spar having about forty-eight per cent. of calcium to fifty-two parts of fluorine. We sometimes also add about one per cent. of calcined borax and two per cent. of calcined alum.

We sometimes use the following proportion of parts instead of the one first above given, to wit: Six parts fluor-spar, four parts carbonate of soda, two parts sulphate of lime; but we do not desire to limit ourselves to proportion of parts, as they may be variously modified or changed and still very good results be obtained.

The flux, prepared as above described, melts very readily, adheres to iron or steel, and forms a thin coating for the same; expels the impurities contained in the pores of the metal; prevents the deleterious action of carbon and oxygen in the heating process, and enables the best qualities of steel to be heated, when coated with this compound, to a very high degree of heat without decarbonizing, and thus allows it to be hammered, welded, or drawn in a much better manner than by the processes and materials hitherto employed for this purpose. Carbonate of soda is employed chiefly to cause the compound to melt readily at a low heat, and readily adhere to the surfaces of the metal; but carbonate of soda may be omitted and still obtain the principle results desired to be accomplished, and such compound forms the subject-matter of a separate application for Letters Patent filed by us on the 4th day of October, 1883. Substitutes may also be used for the soda in the above-named compound to very great advantage—such as borax and alum—and a very good result be obtained.

We do not wish to confine ourselves to sulphate of lime in preparing the above compound, as other formations of lime may be employed by the addition of substances or other suitable treatment, which will produce the same chemical result as sulphate of lime; but the compound, as first above described, we deem the simplest, cheapest, and best.

By sulphate of lime we mean uncalcined gypsum. This is used for the sulphur and calcium contained therein. Other substances containing these elements could be substituted with greater or less efficacy and good results obtained—such as sulphate of magnesia; but it would not melt as readily as where sulphate of lime is employed; as also sulphate of soda and fluor-spar might be used to form our flux, calcium being added if the fluor-spar does not contain enough.

We claim—

1. A flux composed of fluoride of calcium, carbonate of soda, and sulphate of lime, mechanically mixed, substantially as described.

2. As a new article of manufacture, a flux composed of fluor-spar, carbonate of soda, and sulphate of lime, mechanically mixed, substantially as herein set forth.

In testimony whereof we have hereunto set our hands.

EDWARD A. WHITCOMB.
JOHN J. RIDDLE.

Witnesses:
E. E. WOOD,
JNO. E. JONES.